United States Patent [19]

Castagno et al.

[11] Patent Number: 5,364,539
[45] Date of Patent: Nov. 15, 1994

[54] METHOD AND MEANS FOR SCREENING SOLIDS FROM A LIQUID MEDIUM

[75] Inventors: Leo L. Castagno; Christopher L. Hudson, both of Creston, Iowa

[73] Assignee: Vanmark Corporation, Creston, Iowa

[21] Appl. No.: 17,754

[22] Filed: Feb. 16, 1994

[51] Int. Cl.$^5$ ............................................. B01D 37/00
[52] U.S. Cl. .................................. 210/768; 210/791;
210/86; 210/91; 210/134; 210/261; 210/297;
210/391; 100/37; 100/48; 100/116; 100/126;
100/127
[58] Field of Search .................. 210/768, 791, 86, 91,
210/102, 134, 261, 297, 33.01, 209, 359, 388,
391; 100/37, 116, 126, 127, 48, 233, 99

[56] References Cited

U.S. PATENT DOCUMENTS

| | | | |
|---|---|---|---|
| 3,168,033 | 2/1965 | Hansen | 100/127 |
| 3,623,607 | 11/1971 | Loos | 210/106 |
| 4,019,984 | 4/1977 | Mohn | 100/37 |
| 4,303,412 | 12/1981 | Baikoff | 100/37 |
| 4,421,022 | 12/1983 | Burgin | 100/127 |
| 4,676,154 | 6/1987 | Steinort | 100/37 |
| 5,001,911 | 3/1991 | Eck et al. | 100/116 |

FOREIGN PATENT DOCUMENTS

| | | |
|---|---|---|
| 0232952 | 8/1987 | European Pat. Off. . |
| 695605 | 8/1953 | United Kingdom . |
| 1080501 | 8/1967 | United Kingdom . |
| 1491108 | 11/1977 | United Kingdom . |
| 2119670 | 11/1983 | United Kingdom . |

*Primary Examiner*—Robert A. Dawson
*Assistant Examiner*—Ana M. Fortuna
*Attorney, Agent, or Firm*—Zarley, McKee, Thomte, Voorhees & Sease

[57] ABSTRACT

The device of the present invention removes suspended solids from a liquid medium, such as particles in an oil-based sludge. The device includes a filter chamber having an inlet for introducing liquid into the chamber, with the liquid containing suspended solids. The chamber also has an outlet for releasing filtered liquid which is substantially free from suspended solids. The liquid coming into the chamber is forced through a filter element to remove the suspended solids therefrom. The removed solids are compressed in the chamber by a reciprocating piston. When a sufficient quantity of suspended solids accumulate within the chamber, a discharge valve is opened and the compressed solids are discharged from the chamber. The device is operated automatically by a computer, which controls a series of operation cycles, including normal filtering operation, compression of solids, purging of solids, and cleansing of the filter element.

19 Claims, 4 Drawing Sheets

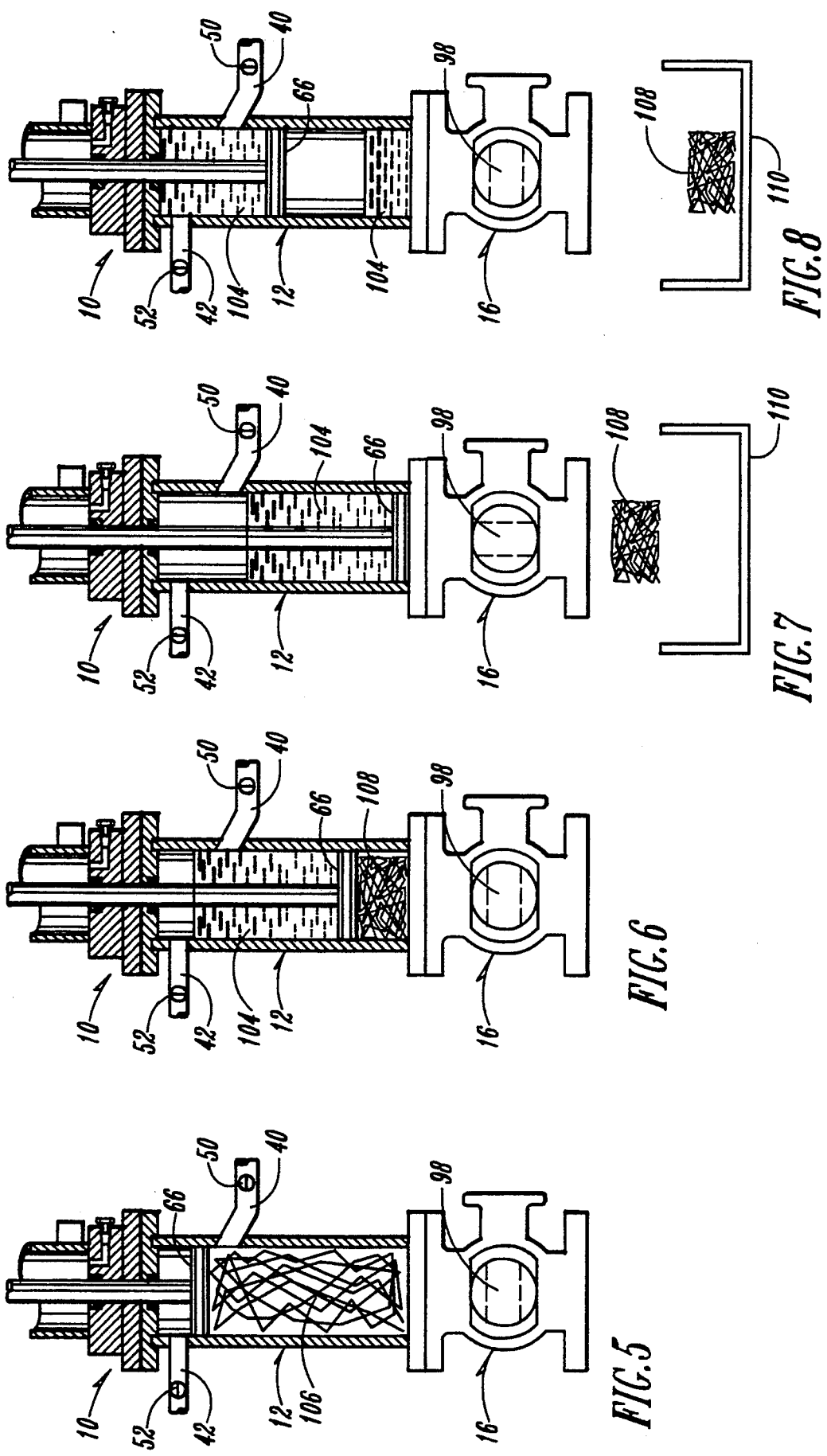

METHOD AND MEANS FOR SCREENING SOLIDS FROM A LIQUID MEDIUM

BACKGROUND OF THE INVENTION

Industrial and commercial frying operations, such as the manufacture of potato chips, use large quantities of oil. During any frying operation, portions of the fried material may flake off, such as skin from potatoes. These flakes are carbon particles. Some of these particles stick to the food being cooked and cause a blemish thereon. Other particles remain suspended in the oil and must be removed before the oil can be recycled for further use.

In typical commercial and industrial frying operations, the used oil containing the suspended solids is sent to a centrifuge separator, such as that manufactured by Lakos, which concentrates the solids into a liquid sludge-type medium. Clean oil from the separator can be returned to the fryer for reuse. The sludge is sent to a filter vessel which has to be manually opened and cleaned, thereby exposing the operator to hot oil at a temperature of approximately 360° F. Thus, the manual replacement of the filter element of the filter vessel presents risks of burn, as well as exposing the environment to the oily, dirty sludge. Also, the operator cannot tell when the filter element in the filter vessel is full. Therefore, cleaning of the filter element may occur too early or too late, rather than at the optimal time just as the filter element becomes full. Also, since the sludge is not compacted in the filter vessel, the volume of sludge requires the element to be changed more frequently than would be necessary with compacted sludge. Furthermore, oil in the sludge is not recovered and therefore wasted.

Therefore, a primary objective of the present invention is the provision of a method and means for screening solids from a liquid medium so that cleaned liquid may be recycled for further use.

Another objective of the present invention is the provision of a device for removing suspended solids from oil and other sludge-type liquid mediums.

Another objective of the present invention is the provision of a device wherein the waste solids are discharged from the device automatically and without manual handling.

Still a further objective of the present invention is the provision of a method and means for filtering oil having suspended solids therein, so as to recover recyclable oil therefrom, and for compressing the removed solids before being discharged.

Another objective of the present invention is the provision of a safe and efficient method and means of removing suspended solids from a liquid.

These and other objectives will become apparent from the following description of the invention.

SUMMARY OF THE INVENTION

The device for removing suspended solids from a liquid comprises a chamber with a cylindrical wall and having an inlet for introducing liquid into the chamber. The liquid contains suspended solids. The chamber also has an outlet for releasing liquid which has been cleansed so as to be substantially free from suspended solids. A discharge opening is provided for removing solids from the chamber. In one embodiment, a filter element is mounted in a double acting piston which is mounted within the chamber for axial movement therein. The liquid is forced through the filter element in the piston so that solids are removed from the liquid. As the piston moves toward the bottom of the chamber, the solids are compressed. As the piston moves in the opposite direction toward the upper end of the chamber, liquid is back-flushed through the filter element to remove solids therefrom so as to clean the filter element. After a predetermined level of solids are accumulated within the chamber, a discharge valve is opened so that the compressed solids can be removed through the discharge opening in the bottom of the chamber. A computer controls the introduction and release of liquid into the chamber, and controls movement of the piston for compression and discharge of the solids from the chamber.

In a second embodiment, the filter element is in the form of a cylinder extending substantially along the cylindrical wall of the chamber. The liquid is introduced into the interior of the chamber and is forced radially outwardly through the filter element into a drainage area adjacent the chamber wall. A piston mounted within the chamber is actuated to scrape solids from the cylindrical filter element and to compress the solids. As with the first embodiment, when the solids accumulate to a predetermined level in the chamber, a discharge valve is opened so that the solids can be automatically removed through a discharge opening for disposal.

In operation, liquid containing suspended solids is introduced into the chamber and forced through the filter so as to remove the solids from the liquid. The cleaned liquid, which is substantially free from suspended solids, is released from the chamber for recycling. The suspended solids removed by the filter element are compressed, and eventually discharged from the chamber without any manual handling thereof.

DESCRIPTION OF THE DRAWINGS

FIGS. 5-8 are partial side elevation sectional views showing the device during various stages of operation.

DESCRIPTION OF PREFERRED EMBODIMENT

Figure 1:
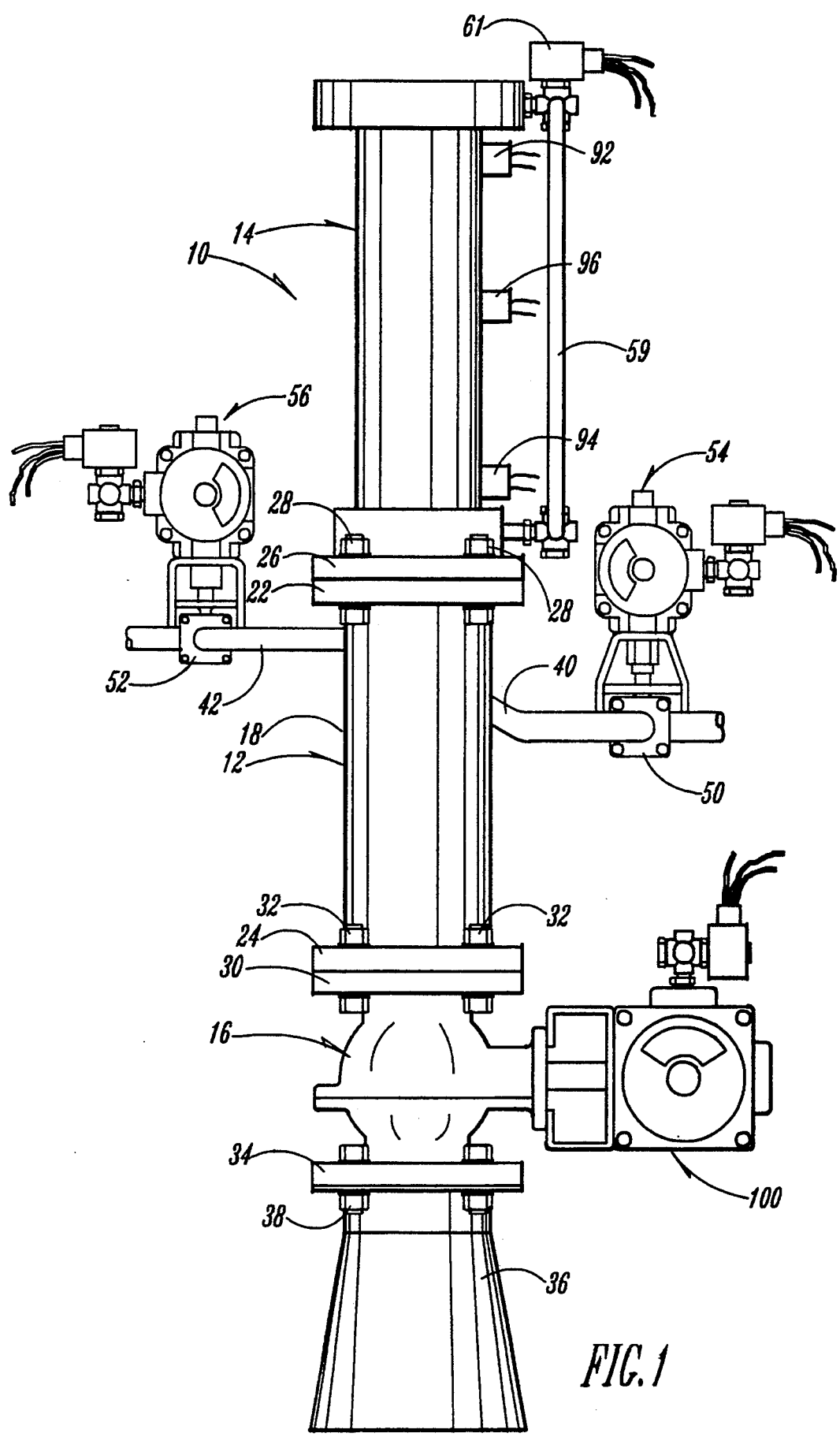
FIG. 1 is a side elevation view of the device of the present invention.

The device of the present invention is generally designated in the drawings by the reference numeral 10. The device 10 includes a central filter cylinder 12, an upper pneumatic cylinder 14, and a lower discharge portion 16. More particularly, the filter cylinder 12 includes a cylindrical wall 18 defining a collection chamber 20 therein. The wall 18 is connected to an upper flange 22 and a lower flange 24. The upper flange 22 of the cylinder 12 is secured to a lower flange 26 of the pneumatic cylinder 14 with a plurality of nut and bolt assemblies 28, as best seen in FIG. 1. Similarly, the lower flange 24 of the cylinder 12 is secured to an upper flange 30 of the discharge portion 16 using a plurality of nut and bolt assemblies 32. A lower flange 34 on the discharge portion 16 is bolted to a discharge chute 36 with a plurality of nut and bolt assemblies 38.

The filter cylinder 12 includes a liquid inlet line 40 and a liquid outlet line 42. The inlet line 40 and the outlet line 42 each has a valve 50, 52, respectively which are movable between open and closed positions. A conventional pneumatic actuator 54 is operatively connected to valve 50 to control the position thereof. Similarly, a conventional pneumatic actuator 56 is operatively connected to the valve 52 to move the valve between the open and closed positions.

Figures 2, 3, 4:
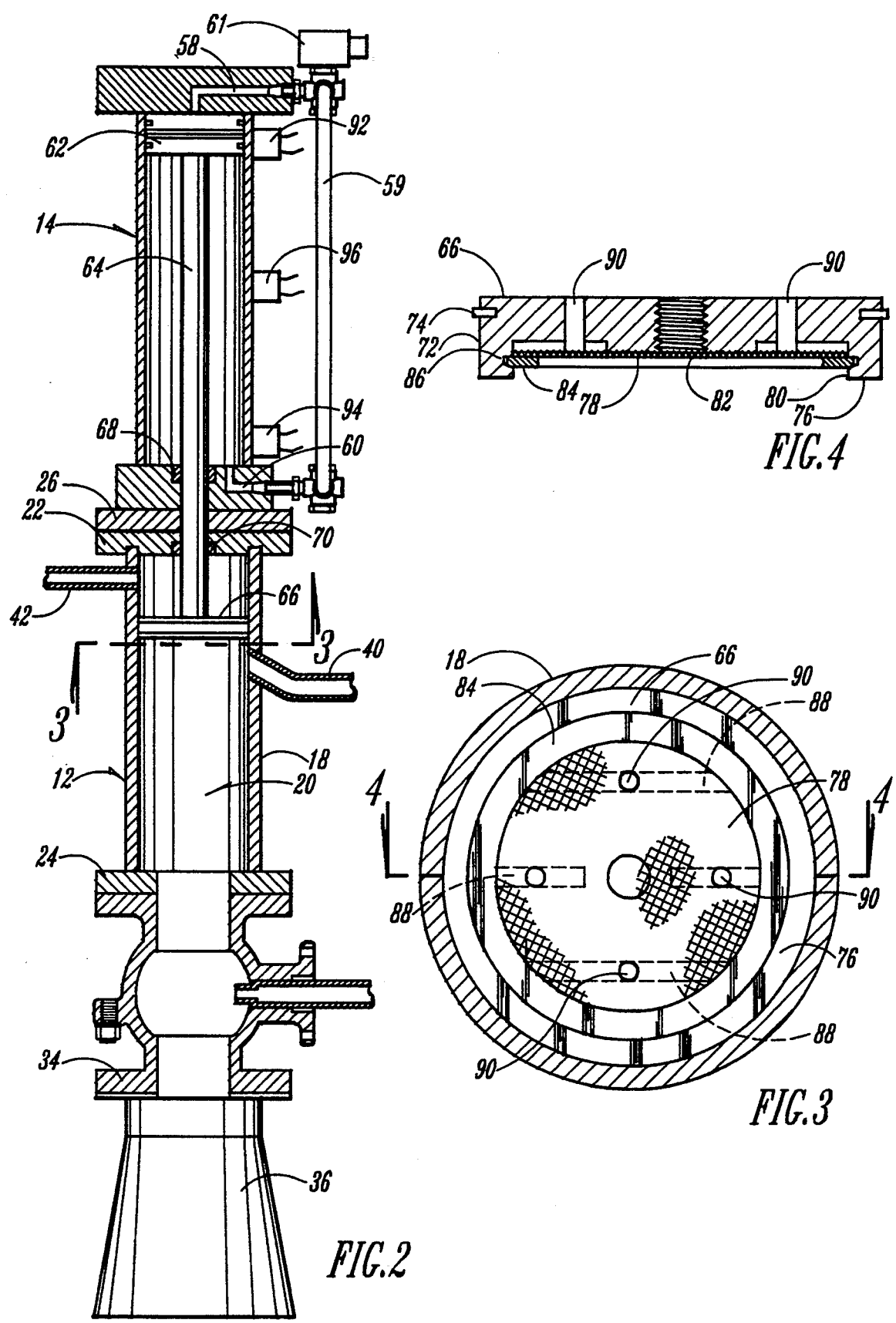
FIG. 2 is a side elevation sectional view of the device of the present invention.
FIG. 3 is a view of the piston in the filter chamber of the device, as taken along lines 3—3 of FIG. 2.
FIG. 4 is a sectional view of the piston taken along lines 4—4 of FIG. 3.

The pneumatic cylinder 14 includes an upper air line 58 and a lower air line 60 at the opposite ends of the cylinder, as best seen in FIG. 2. Lines 58 and 60 are interconnected by line 59. An air supply line selectively provides air to the inlets 58, 60, as regulated by a solenoid 61. A double acting piston 62 is mounted within the pneumatic cylinder 14 for axial movement between the ends of the cylinder. The piston 62 is mounted upon a shaft 64 which extends through the lower end of the pneumatic cylinder and into the filter cylinder 12, as seen in FIG. 2. A piston 66 is mounted on the lower end of the shaft 64 within the filter chamber 20. A seal 68 is provided around the shaft 64 at the lower of the pneumatic cylinder 14, and a seal 70 is provided around the shaft 64 at the upper end of the filter cylinder 12, as seen in FIG. 2, though other means of sealing may be employed. The shaft 64 is shown in FIG. 4 to be threadably attached to the piston 66, though other means for connecting the piston to the shaft may be employed.

As seen in FIG. 4, the piston 66 includes a perimeter edge 72 with a sealing piston ring 74 mounted therein. The piston 66 includes a lower annular surface 76 and an interior recessed surfaced 78, with an axially extending wall 80 extending therebetween. A filter element 82 engages the recessed surface 78 and is held in position by a retaining ring 84 received within a slot 86 extending around the wall 80. Preferably, filter element 82 is a Vee-Wire screen manufactured by Johnson Filtration Systems. A plurality of grooves 88 are machined into the recessed surface 78 to direct liquid passing through the filter element 82 to passages 90 extending through the piston 66. The grooves 88 serve as collection troughs and can be formed in any desired pattern.

The pneumatic cylinder 14 includes an upper proximity switch 92, a lower proximity switch 94, and an intermediate proximity switch 96. The proximity switches 92, 94 and 96 sense the position of piston 62 within the pneumatic cylinder 14, as described in further detail below.

The discharge portion 16 includes a valve 98 movable between open and closed positions. A conventional pneumatic actuator 100 controls the movement of the valve 98 between the open and closed positions.

Figure 9:
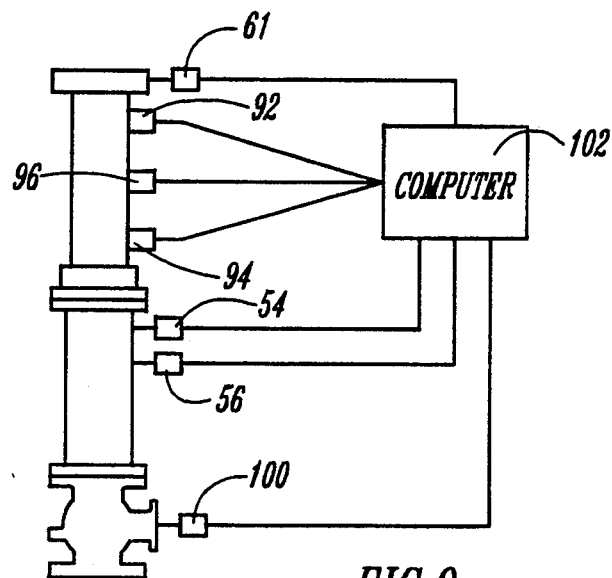
FIG. 9 is a schematic view showing the interconnection of the device with a computer or microprocessor.

As seen in FIG. 9, the solenoid 61 for the air supply line, the proximity switches 92, 94, and 96, and the pneumatic actuators 54, 56 and 100 are operatively connected to a computer or processing unit 102 which controls the operation of the device 10.

Normal operation of the device 10 is shown in FIG. 5. In the normal operation mode, valves 50 and 52 are open so that fluid containing suspended solids enters the filter chamber 20 through the inlet line 40. Valve 98 is normally closed. The fluid pressure forces the liquid 104 upwardly through the filter element 82 and through the passages 90 in the piston 66, such that clean liquid, substantially free from suspended solids is expelled by the chamber 20 through the outlet line 42. Suspended solids 106 removed by the filter element are collected in the chamber below the piston 66.

At a preselected time, the computer 102 actuates the pneumatic actuators 54, 56 to close the valves 50 and 52 in the inlet and outlet lines 40, 42. The computer 102 also actuates the solenoid 61 so as to introduce air into air inlet line 58, thereby forcing the pistons 62 and 66 downwardly in their respective cylinders. The piston 66 thereby compresses the solids in the bottom of the filter chamber 20, as seen in FIG. 6. If, during the compression cycle, the piston 62 moves past the intermediate proximity switch 96, solenoid 61 will direct air into the lower air line 60 so as to raise the pistons 62, 66 upwardly to the initial position shown in FIG. 5, until sensed by switch 92. The valves 50, 52 will then open such that additional liquid will be introduced into the filter chamber and normal operation will proceed.

The compression cycle will be repeated at preselected spaced intervals, as described above. When there is a sufficient accumulation of suspended solids in the chamber 20 such that the piston 62 does not pass the intermediate proximity switch 96 during the compression cycle, the computer 102 will actuate the pneumatic actuator 100 so as to open the valve 98 in the discharge portion 16. The pistons 62 and 66 will continue to descend in their respective cylinders so that the compressed solids 108 will be discharged from the chamber 20 and into the discharge portion 16. When the piston 62 reaches the level of the lower proximity switch 94, the computer 102 will close the valve 98 in the discharge portion 16 of the device 10. Air will then be directed into air inlet line 60 at the lower end of the pneumatic cylinder 14 so as to raise the pistons 62 and 66. As seen in FIG. 8, when the piston 66 is being raised, the liquid 104 is forced downwardly through the passages 90 in the piston and through the filter element 82, so as to back-flush and clean the filter element. Once the piston 62 reaches the upper proximity switch 92, the computer opens the valves 50 and 52 in the liquid inlet and outlet lines 40, 42, respectively, such that the normal operation of the device can start over.

During the normal operation cycle shown in FIG. 5, the valves 50, 52 in the inlet and outlet lines 40, 42, respectively, are open and liquid is forced upwardly through the filter element 82 by the pressure in the line 40. During the compression cycle shown in FIG. 6, the purge cycle shown in FIG. 7, and the filter cleaning cycle shown in FIG. 8, the liquid control valves 50 and 52 in the liquid inlet and outlet lines 40, 42, respectively, remain closed such that no liquid is lost from the chamber 20. During the compression cycle, liquid is forced upwardly through the filter element 82 by the advancement of the piston 66. During the purging cycle, when the valve 98 is open, the compressed solids 108 act as a plug to prevent liquid from passing through the discharge valve 98. When the valve 98 closes, it shears off a portion of the compacted solids below the valve, while a portion of the compressed solids remains above the valve to serve as the plug. During the filter cleaning cycle, the liquid 104 is forced downwardly through the filter element by the retraction of the piston 66

Thus, the device 10 is automatically operated by the computer 102 through a normal filtering cycle, a periodic compression cycle, a purge cycle when sufficient solids are accumulated, and a cleaning cycle. There is no exposure of an operator or the environment to hot oil or liquid.

Figure 10:
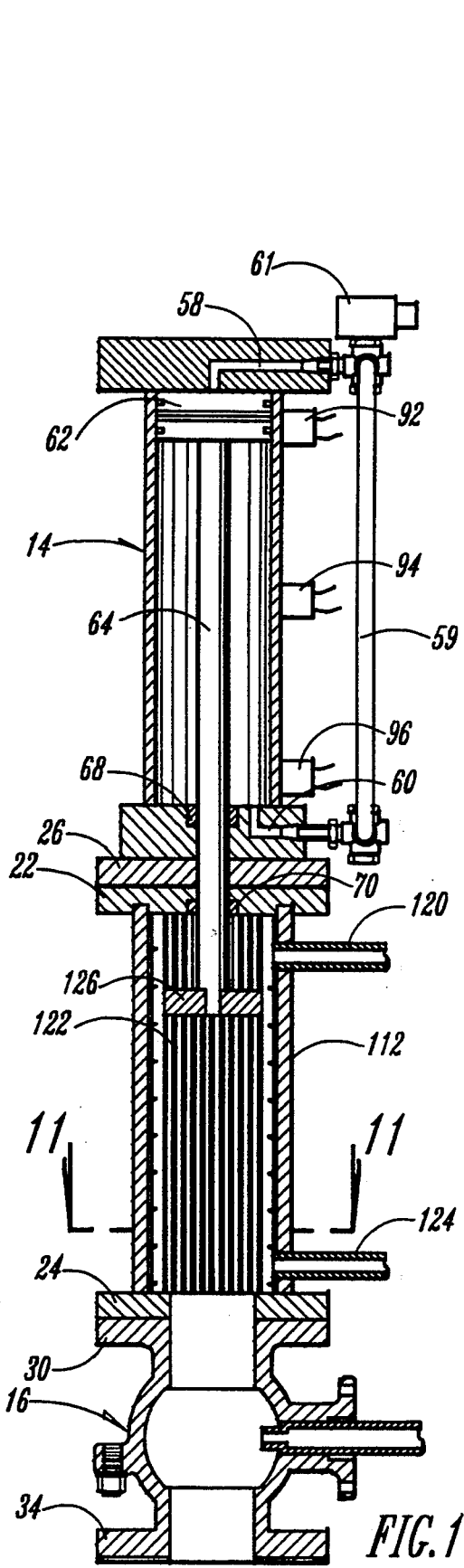
FIG. 10 is a view similar to FIG. 2 showing an alternative embodiment of the device.
Figure 11:
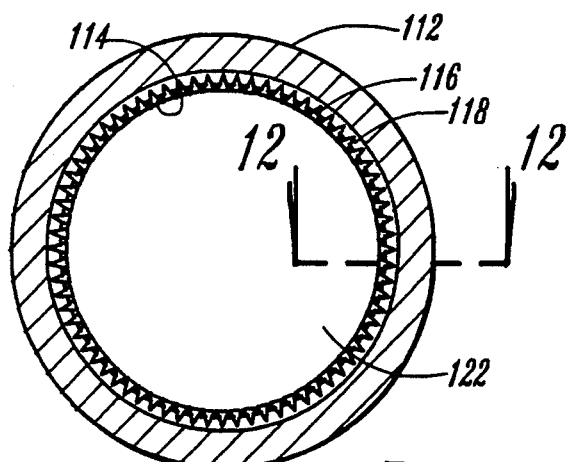
FIG. 11 is a sectional view taken along lines 11—11 of FIG. 10.
Figure 12:
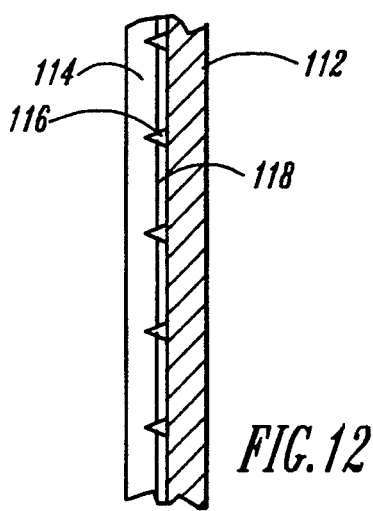
FIG. 12 is a partial sectional view taken along lines 12—12 of FIG. 11.

An alternative embodiment of the present invention is shown in FIGS. 10–12. In the alternative embodiment, the filter cylinder 112 is modified from that shown in FIGS. 1 and 2, but the pneumatic cylinder 14 and discharge portion 16 are unchanged. In the alternative embodiment, the filter element 114 is constructed of a Vee-Wire screen formed into a cylinder so as to mate with the wall of the filter cylinder 112. The bearing bars 116 on the element 114 engage the inner wall surface, as seen in FIG. 12, so as to define a drainage area 118 between the filter element 114 and the cylinder wall. The liquid inlet line 120 extends through the wall of the filter cylinder 112 and through the filter element 114 so that liquid is introduced into the interior chamber 122 of the cylinder 112. As the liquid fills the chamber, it is forced radially outwardly through the filter element 114 so as to remove suspended solids from the liquid. The cleaned liquid, which is substantially free from suspended solids, is drained through an outlet conduit 124 which is in communication with the drainage area 118 adjacent the bottom of the cylinder 112.

The device of the alternative embodiment shown in FIGS. 10–12 operates substantially similar to the device 10 described above, except that there is no back-flushing of the filter element 114, as described above with respect to FIG. 8. During the compression cycle, the piston 126, which is solid and has no filter element therein, scraps the inside of the filter element 114 to remove solids therefrom and to compact the solids in the bottom of the chamber 122. The compression cycle and purge cycle for the alternative device is similar to those cycles as described above.

The invention has been shown and described above in connection with the preferred embodiment, and it is understood that many modifications, substitutions and additions may be made which are within the intended broad scope of the invention. From the foregoing, it can be seen that the present invention accomplishes at least all of the stated objectives.

What is claimed is:

1. A device for removing suspended solids from a liquid, comprising:
   a chamber having an inlet for introducing a liquid containing suspended solids, a liquid outlet for releasing liquid substantially free from suspended solids, and a discharge opening for removing solids from the chamber;
   movable filter means within the chamber through which the liquid passes to remove suspended solids therefrom;
   means for moving the filter means between first and second positions within the chamber; and
   the filter means dividing the chamber into first and second compartments, each compartment having a volume which varies as the filter means moves between the first and second positions, the inlet being in communication with the first compartment at least during the introduction of liquids containing suspended solids into the first compartment, and the liquid outlet being in communication with the second compartment.

2. The device of claim 1 further comprising valve means in the inlet and the outlet to control the flow of liquid through the chamber, and wherein liquid is forced through the filter in one direction to remove solids from the liquid and the liquid is back-flushed through the filter in the opposite direction to remove solids from the filter.

3. The device of claim 1 further comprising processor means for controlling the introduction and release of the liquid, and for controlling the movement of the filter means and discharge of the solids.

4. The device of claim 1 wherein the filter means is mounted on a double acting piston mounted within the chamber for axial movement therein.

5. The device of claim 4 wherein the piston includes passages therein, such that the liquid flows through the filter element and the passages.

6. The device of claim 5 further comprising means for moving the piston between a first position and a second position, the liquid being forced through the filter as the piston moves between the first and second positions.

7. The device of claim 4 further comprising sensor means operatively connected to the piston for sensing the position of the piston relative to the chamber.

8. The device of claim 7 wherein the sensor means is at least one proximity switch.

9. The device of claim 4 further comprising pneumatic means for moving the piston within the chamber.

10. The device of claim 1 further comprising sensing means for sensing the level of solids within the chamber.

11. The device of claim 1 further comprising first and second valve means operatively connected to the inlet and outlet, respectively, for controlling flow of liquid into and out of the chamber.

12. The device of claim 1 further comprising a valve in the discharge opening movable between open and closed positions for controlling the discharge of solids from the chamber.

13. A method of screening solids from liquid, comprising: introducing a liquid into a first compartment of a chamber having an inlet, a liquid outlet, and a solid discharge, the liquid containing suspended solids therein; forcing the liquid through a movable filter located in the chamber and into a second compartment of the chamber so as to remove solids from the liquid, the solids remaining in the first compartment of the chamber; moving the filter between first and second positions within the chamber; and releasing liquid from said second compartment through said outlet.

14. The method of claim 13 wherein the released liquid is substantially free from suspended solids.

15. The method of claim 13 further comprising back-flushing the filter with the liquid to remove solids from the filter.

16. The method of claim 13 further comprising sensing the level of solids in the chamber and discharging the solids from the chamber after the level reaches a predetermined value.

17. The method of claim 13 further comprising discharging the solids from the chamber.

18. The method of claim 17 further comprising controlling the flow of fluid into and out of the chamber and controlling the movement of the filter and discharge of solids from the chamber with a processor means.

19. The method of claim 13 wherein the solids form a plug to prevent liquid from escaping through a discharge opening through which the solids are periodically discharged.

* * * * *